(12) United States Patent
Yamada et al.

(10) Patent No.: US 12,447,928 B2
(45) Date of Patent: Oct. 21, 2025

(54) VEHICLE WITH INTERIOR IMAGING SYSTEM

(71) Applicant: TOYOTA JIDOSHA KABUSHIKI KAISHA, Toyota (JP)

(72) Inventors: Kenichi Yamada, Nisshin (JP); Toshiki Kashiwakura, Tokyo (JP); Akane Umezu, Nagoya (JP); Kayo Tsumoto, Nisshin (JP); Yuta Shishime, Tokyo (JP); Satoshi Komamine, Nagoya (JP); Kenji Ishiyama, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 18/469,005

(22) Filed: Sep. 18, 2023

(65) Prior Publication Data
US 2024/0198963 A1    Jun. 20, 2024

(30) Foreign Application Priority Data
Dec. 14, 2022 (JP) ................. 2022-199783

(51) Int. Cl.
| | | |
|---|---|---|
| B60R 25/30 | (2013.01) | |
| B60R 25/01 | (2013.01) | |
| B60R 25/102 | (2013.01) | |
| B60R 25/31 | (2013.01) | |
| G06V 20/59 | (2022.01) | |
| G06V 40/10 | (2022.01) | |

(52) U.S. Cl.
CPC ............ *B60R 25/305* (2013.01); *B60R 25/01* (2013.01); *B60R 25/102* (2013.01); *B60R 25/31* (2013.01); *G06V 20/59* (2022.01); *G06V 40/10* (2022.01)

(58) Field of Classification Search
CPC ..... B60R 25/102; B60R 25/305; B60R 25/31; B60R 25/30; B60R 25/307; B60R 25/2018; G06V 20/59; G06V 20/593; G06V 40/10; G06V 40/107
USPC .......................................................... 348/148
See application file for complete search history.

(56) References Cited

U.S. PATENT DOCUMENTS

| | | | | |
|---|---|---|---|---|
| 2016/0300463 A1* | 10/2016 | Mahar | .................... | H04N 7/183 |
| 2022/0114817 A1* | 4/2022 | Gronau | ................... | G06V 40/10 |
| 2022/0281413 A1* | 9/2022 | Liu | .......................... | B60R 25/31 |
| 2022/0374640 A1* | 11/2022 | Sakamoto | ............ | H04N 23/698 |
| 2023/0230486 A1* | 7/2023 | Komiyama | .......... | G08G 1/0112 |
| | | | | 340/933 |

FOREIGN PATENT DOCUMENTS

| | | |
|---|---|---|
| JP | 2002-123880 A | 4/2002 |
| JP | 2021-121885 A | 8/2021 |
| JP | 2021-140698 A | 9/2021 |

* cited by examiner

*Primary Examiner* — Nathnael Aynalem
(74) *Attorney, Agent, or Firm* — SoraIP, Inc.

(57) ABSTRACT

A vehicle includes a camera, a detection mechanism, and a processor. The camera is mounted on the vehicle and captures images of the vehicle's interior. The detection mechanism detects that the vehicle is unlocked by an authorized worker. Upon detection of such unlocking, the processor triggers the camera to capture images within a predetermined range.

5 Claims, 6 Drawing Sheets

VEHICLE WITH INTERIOR IMAGING SYSTEM

CROSS-REFERENCE TO RELATED APPLICATION

This application claims priority to Japanese Patent Application No. 2022-199783 filed on Dec. 14, 2022, incorporated herein by reference in its entirety.

BACKGROUND

1. Technical Field

The present disclosure relates to a vehicle that receives a charging service.

2. Description of Related Art

A system has been proposed in which a charging service provided by a business operator is reserved when a battery charge amount becomes equal to or less than a predetermined value in a vehicle traveling using electricity as a power source (for example, refer to Japanese Unexamined Patent Application Publication No. 2021-121885 (JP 2021-121885 A)). In the service described in the related art, a power supply vehicle of the business operator goes to a location of a vehicle requiring charging, and a worker of the power supply vehicle inserts a charging plug into a charge port of the vehicle to charge a battery. According to such a technique, it is possible to cause a third party to charge the battery of the vehicle even while a user is away from the vehicle.

SUMMARY

However, when the user is away from the vehicle, in order for the worker of the business operator providing the charging service to charge the vehicle of the user, it is necessary for the worker to perform an operation of opening a door of the vehicle of the user and unlocking a power supply port. The user may feel an anxiety that the worker performs an unauthorized operation other than the work required for charging in the vehicle when the user is absent.

The present disclosure has been made in view of such circumstances, and an object of the present disclosure is to improve a sense of security of the user when receiving the charging service.

A vehicle according to an embodiment of the present disclosure that solves the above issue includes:
- a camera that is mounted on the vehicle and captures an image of an inside of the vehicle;
- a detection unit for detecting unlocking of the vehicle by a predetermined worker; and
- a control unit for causing the camera to start capturing an image of a predetermined range when the detection unit detects that the vehicle is unlocked by the worker.

According to the present disclosure, it is possible to improve the sense of security of the user when receiving the charging service.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

System Configuration

Hereinafter, an embodiment of the present disclosure will be described below with reference to the drawings. Note that the drawings used in the following description are schematic. Dimensions, ratios, and the like in the drawings do not necessarily coincide with actual ones.

Figure 1:
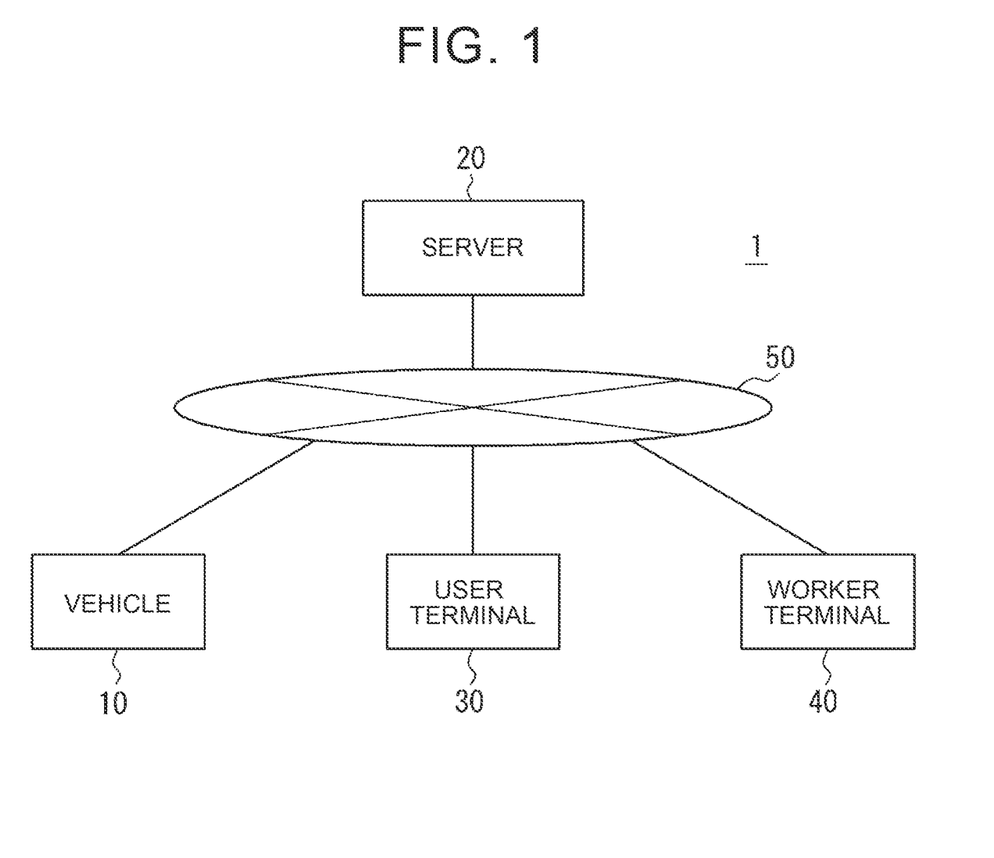
FIG. 1 is a block diagram illustrating a schematic configuration of a system including a vehicle according to an embodiment of the present disclosure.

FIG. 1 is a configuration diagram of a system 1 that dispatches a power supply vehicle 70 (see FIG. 4) that provides a charging service to a vehicle 10 of a user in response to a request from the user. The system 1 includes a vehicle 10, a server 20, a user terminal 30, and a worker terminal 40, and a network 50 that connects these components so as to be able to communicate with each other. One or more of the vehicle 10, the user terminal 30, and the worker terminal 40 exist.

The vehicles 10 are externally chargeable electrified vehicle including Battery Electric Vehicle (BEV) and Plug-in Hybrid Electric Vehicle (PHEV).

The server 20 is a computer operated by a provider that provides a charging service. The server 20 can receive a charging request from an information terminal mounted on the vehicle 10 of the user or the user terminal 30 carried by the user. The charging request includes a request for immediate charging and a request for reserving charging by specifying a time. The server 20 assigns a worker 60 (see FIG. 3) and a power supply vehicle 70 (see FIG. 4) to be dispatched to the vehicle 10 of the user based on a charging request from the user. The processing performed by the server 20 may be executed in a distributed manner on a plurality of computers.

The user terminal 30 is an information processing device such as a Personal Computer (PC) carried by a user, a smart phone, and a portable information terminal. The user terminal 30 includes a display for displaying information, an input unit for inputting information, a processor for executing various arithmetic processing, and a memory for storing information and a program. The user terminal 30 may be equipped with an application provided by a business operator for receiving a charging service. When the charging service is provided as the membership service, the user uses the user terminal 30 to register information of the vehicle 10 with the server 20 in advance. The information of the vehicle 10 to be registered includes information such as a registration number of the vehicle 10, a vehicle type, and a color, information for communicating with the vehicle 10, and the like. The user can request the server 20 to charge the vehicle 10 using the user terminal 30. The request for charging the server 20 may include identification information of the user registered in the server 20, a time and a place of charging, identification information of the vehicle 10 registered in the server 20, and the like.

The worker terminal 40 is a mobile information terminal such as a smartphone carried by the worker 60 of the business operator providing the charging service. The worker terminal 40 includes a display for displaying information, an input unit for inputting information, a processor for executing various arithmetic processing, and a memory for storing information and a program. The worker terminal 40 can receive the schedule information for charging from the server 20 using the power supply vehicle 70. The schedule information received by the worker terminal 40 includes identification information such as a time, a place, a registration number of the vehicle 10, a vehicle type, and a color at which one or more vehicles 10 are charged. Further, the worker terminal 40 may receive a digital key for unlocking the vehicle 10.

The network 50 includes a wide area network such as the Internet. The vehicle 10, the server 20, the user terminal 30, and the worker terminal 40 are connected to a wide area network via an access line. Access lines may include, but are not limited to, a fourth generation mobile communication system (4G), such as a third generation mobile communication system (3G), Long Term Evolution (LTE), a fifth generation mobile communication system (5G), Wi-Fi, and Worldwide Interoperability for Microwave Access (WiMAX).

Configuration of Vehicle

Figure 2:
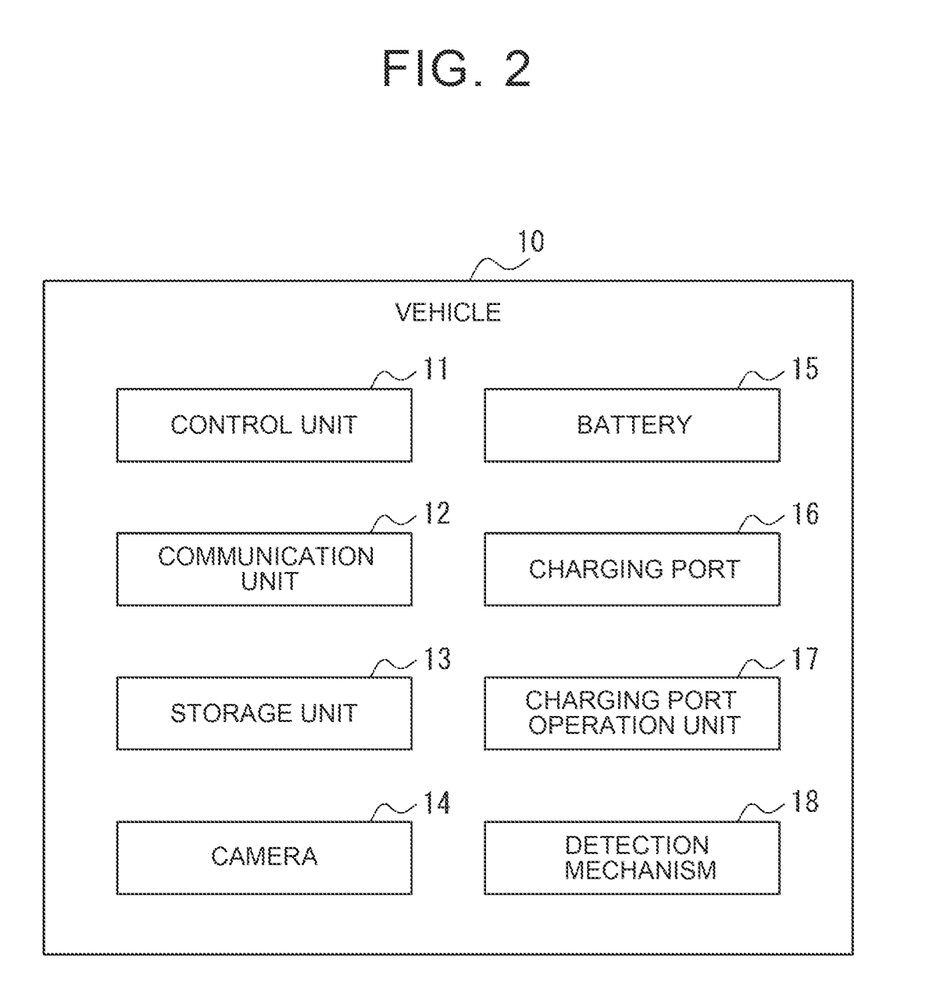
FIG. 2 is a block diagram showing a schematic configuration of the vehicle of FIG. 1.
Figure 3:
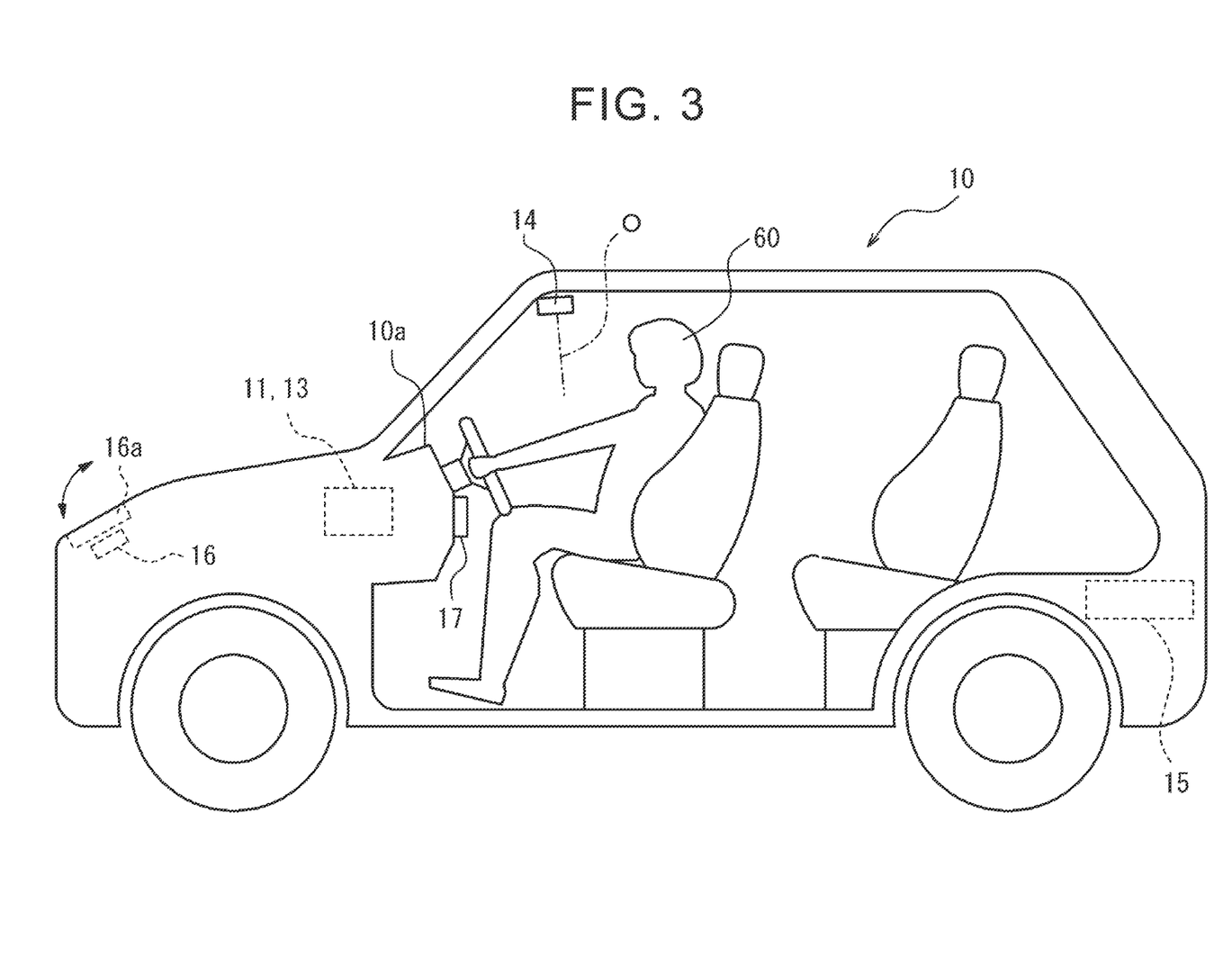
FIG. 3 is a cross-sectional view showing a state in which a worker rides on the vehicle of FIG. 1 with a part of the vehicle cabin cut away.

As illustrated in FIGS. 2 and 3, the vehicle 10 includes a control unit 11, a communication unit 12, a storage unit 13, a camera 14, a battery 15, a charging port 16, a charging port operation unit 17, and a detection mechanism 18. The detection mechanism 18 functions as a detection unit. Vehicle 10, in addition to these, the drive mechanism usually vehicle 10 comprises a braking mechanism, a control mechanism, a sensor, and safety equipment or the like. The vehicle 10 may further include an information terminal for requesting the server 20 to charge. In the following description, it is assumed that the user uses the user terminal 30 instead of the information terminal provided in the vehicle 10.

The control unit 11 includes at least one processor, at least one dedicated circuit, or a combination thereof. The processor is a general-purpose processor such as a CPU or a GPU, or a dedicated processor specialized for a specific process. The dedicated circuit is, for example, an FPGA or an ASIC. The control unit 11 executes various processes described below when the vehicle 10 receives charging using the charging service. Part of the processing executed by the control unit 11 may be executed by an external information processing apparatus such as the server 20. Even when the external information processing apparatus executes a part of the processing of the control unit 11, the control of each unit of the vehicle 10 is executed via the control unit 11. For this reason, a process executed by the control unit 11 in cooperation with an external information processing apparatus is regarded as a process executed by the control unit 11.

The communication unit 12 includes at least one external communication interface connected to the network 50. The external communication interface is, for example, an interface compatible with a mobile communication standard such as LTE, 4G or 5G. The communication unit 12 receives data used for the operation of the vehicle 10, and transmits data obtained by the operation of the vehicle 10 to the outside (for example, the server 20). The communication unit 12 may further include a communication interface for performing short-range wireless communication with the worker terminal 40. Near field communication includes Near Field Communication (NFC), Bluetooth, and Infrared Data Association (IrDA).

The storage unit 13 includes one or more memories. The memories are, for example, a semiconductor memory, a magnetic memory, or an optical memory, but are not limited to these memories. The memory or memories included in the storage unit 13 may each function as a main storage, an auxiliary storage, or a cache memory, for example. The storage unit 13 stores arbitrary information which is used for operation of the vehicle 10. For 20 example, the storage unit 13 may store a system program, an application program, embedded software, and the like. The storage unit 13 can sequentially store images captured by the camera 14.

The camera 14 is an imaging device that captures an image of the vehicle cabin of the vehicle 10. The camera 14 includes an image sensor. The image sensor includes a Charge-Coupled Device Image Sensor (CCD image sensor) and a Complementary MOS Image Sensor (CMOS image sensor). The camera 14 is disposed, for example, on the indoor upper side of the windshield on the front side of the vehicle 10. The position at which the camera 14 is disposed is not limited to this. The camera 14 can move the range in which the image is acquired. For example, the camera 14 may be equipped with a wide-angle lens to capture a wide range, and may be capable of changing a range in which an image is cut out from the entire captured image. The image extraction may be performed by the control unit 11 instead of the camera 14. In the present application, a range of an image cut out from a wider imaging range may also be referred to as an imaging range. In addition, the camera 14 may have a relatively narrow imaging region, and may include a drive mechanism that changes the direction of the optical axis O of the optical system to change the imaging range. The drive mechanism may be a motor or the like controlled by the control unit 11.

The battery 15 includes, for example, a rechargeable rechargeable battery such as a lithium-ion secondary battery or a nickel-hydrogen secondary battery. In place of the secondary battery, the vehicle 10 may employ another power storage device such as a multilayer capacitor. The battery 15 includes a control circuit that controls current, voltage, temperature, and the like. The battery 15 is configured to acquire the remaining battery capacity of the secondary battery and transmit the remaining battery capacity to the control unit 11. The battery 15 may be located at any location, such as under the rear seat of the vehicle 10 or in a luggage compartment.

Figure 4:
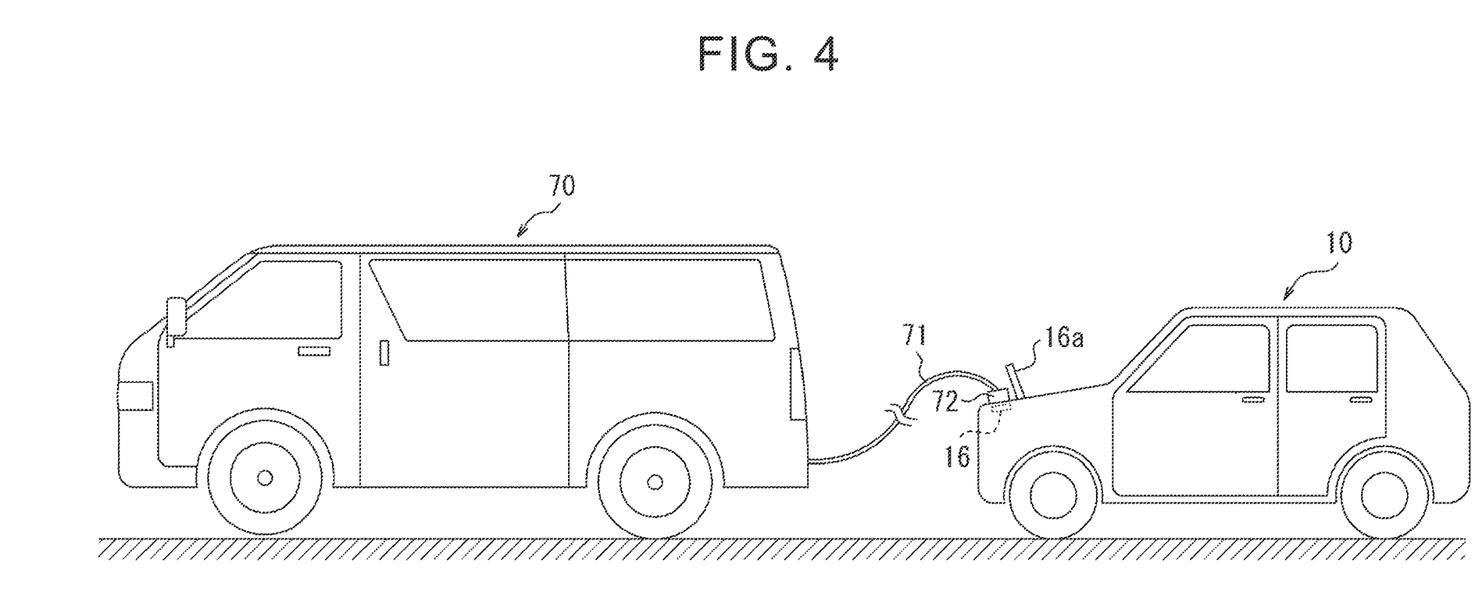
FIG. 4 is a diagram showing a state in which the vehicle of FIG. 1 is charged by a charging vehicle.

The charging port 16 is a connection portion for externally charging the battery 15. The charging port 16 includes a charging inlet for connecting a connector 72 (see FIG. 4) of the charging cable 71 from an external charging device. The charging port 16 includes a charging port cover 16a that can be opened and closed to protect the charging inlet from the outside when charging is not being performed. The charging port cover 16a is locked when charging is not performed in order to protect the charging port 16. When charging the vehicles 10, the charging port cover 16a needs to be opened. The charging port 16 may be disposed at any position of the vehicle 10, such as an upper portion of a front grille of the vehicle 10, a front fender, a rear fender, and a rear bumper. In FIG. 4, the charging port 16 is disposed on the front grille.

The charging port operation unit 17 is a lever, a switch, or the like provided in the vehicle cabin for unlocking the charging port cover 16a of the charging port 16. The charging port operation unit 17 may be referred to as a charging port unlocking lever. The charging port operation unit 17 is a position operable from a driver's seat of the vehicle 10, and may be disposed, for example, on a lateral side of a steering wheel of the vehicle 10, a lower side of an instrument panel, or the like.

The detection mechanism 18 detects unlocking, locking, and the like of the door of the vehicle 10 by the worker 60 designated in advance, and notifies the control unit 11 of the unlocking, locking, and the like. The detection mechanism 18 may be a sensor that detects unlocking of the door. The detection mechanism 18 is a program incorporated in an Electronic Control Unit (ECU) for controlling a door lock of the vehicle 10, and may be configured to transmit a signal for notifying the control unit 11 of unlocking when the lock is unlocked.

Workflow During Charging

When the user uses the service of the provider providing the charging service, the user can operate the user terminal 30 to start the application, and transmit information on the time, location, and vehicle 10 for requesting the charging to the server 20.

The server 20 determines a charging schedule for a plurality of vehicles 10 by one or more workers 60 and one or more power supply vehicles 70 based on a charging request received from one or more users. The server 20 transmits the charging schedule of the worker 60 to the worker terminal 40 carried by each worker 60. The charging schedule of the worker 60 includes a power supply vehicle 70 to be used, a charging time of the vehicle 10 to be charged, a position, identification information, and the like. The server 20 may transmit information necessary for unlocking the vehicle 10 to be charged, such as a digital key, to the worker terminal 40.

The worker 60 gets into the power supply vehicle 70 and goes to the parked place of the user's vehicle 10 according to the charging schedule. Upon arriving at a parked location of the user's vehicle 10, the worker 60 unlocks the vehicle 10 and rides on the vehicle 10, as shown in FIG. 3. The worker 60 operates the charging port operation unit 17 in the vehicle 10 to unlock the charging port cover 16a of the charging port 16.

When the charging port cover 16a is unlocked, the worker 60 extends the charging cable 71 from the power supply vehicle 70 and connects the connector 72 at the front end of the charging cable 71 to the charging port 16 of the vehicle 10, as shown in FIG. 4. Thereafter, the worker 60 starts charging the vehicle 10 by the power supply vehicle 70.

As described above, in order to start charging, the worker 60 needs to unlock the vehicle 10. However, the user of the vehicle 10 may feel anxious about unlocking the vehicle 10 when he/she is absent. Therefore, the vehicle 10 is configured such that, when the worker 60 unlocks the vehicle 10, the camera 14 starts capturing an image of a predetermined range under the control of the control unit 11.

Capturing an image of a predetermined range includes both cutting out an image of a predetermined range from the entire image captured using the wide-angle camera 14 and moving the direction of the optical axis O of the camera 14 to capture a predetermined range. The predetermined range can be, for example, a range in which at least one of the right hand and the left hand of the worker 60 exists. In this case, the control unit 11 analyzes the image captured by the camera 14, recognizes the position of at least one of the right hand and the left hand, and captures an image of the position.

The control unit 11 may be configured to recognize a right hand and a left hand of a person from the captured image by machine learning. Therefore, the storage unit 13 of the vehicle 10 may store a learned model in which images of various human hands are machine-learned as training data. The control unit 11 may input an image acquired from the camera 14 to the learned model to recognize the right hand and the left hand in the image and output the position thereof.

The control unit 11 may accept designation of an imaging range in advance as a predetermined range. The user can specify the imaging range using the user terminal 30. The control unit 11 captures an image of the inside of the vehicle 10 based on the received designation of the imaging range.

Setting the Image Range

Figure 5:
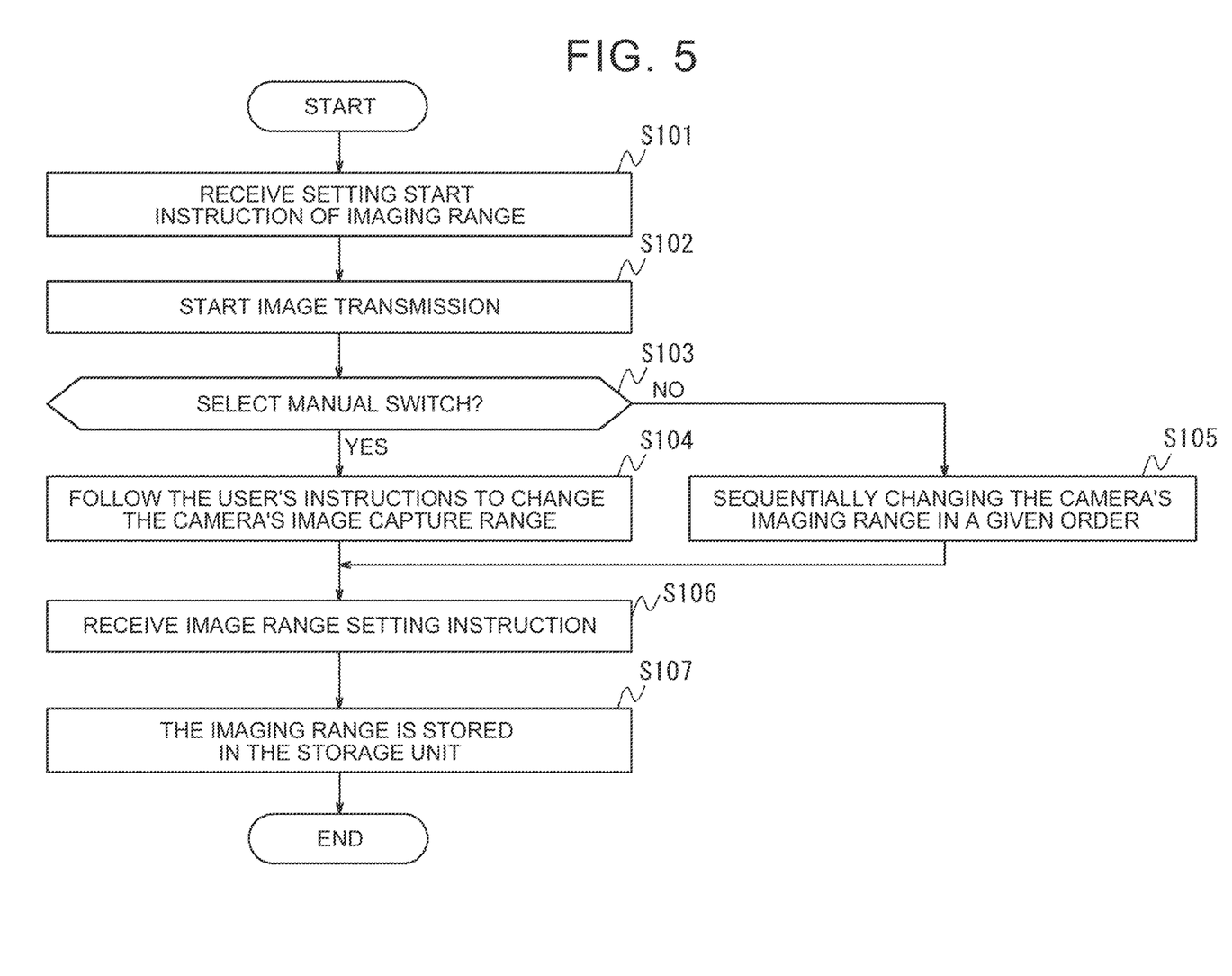
FIG. 5 is a flow chart showing a process by which the control unit of the vehicle of FIG. 1 receives the setting of the imaging range from the user terminal.

Referring to the flow chart of FIG. 5, how the control unit 11 receives the designation of the imaging area will be described. This processing is performed with the user as a starting point in advance before charging of the vehicle 10 by the power supply vehicle 70 is performed. The method disclosed in this specification may be executed by a processor included in the control unit 11 according to a program. Such a program can be stored in a non-transitory computer-readable medium. Non-transitory computer-readable media include, but are not limited to, hard disks, Random Access Memory (RAM), Read Only Memory (ROM), flash memories, Compact Disc Read only memory (CD-ROM), optical storage devices, magnetic storage devices, and the like. The same applies to the imaging method shown in FIG. 6 described later.

When the user activates the application by operating the user terminal 30 and starts designation of the imaging range, the start instruction is transmitted from the user terminal 30 to the vehicle 10. The start instruction may be transmitted via the server 20. Thus, the control unit 11 of the vehicle 10 receives an instruction to start setting of the imaging area via the communication unit 12 (S101).

Upon receiving the setting start instruction of the imaging range, the control unit 11 controls the camera 14 to capture an image in the vehicle 10 in order to confirm the imaging range by the user, and transmits the image to the user terminal 30 via the communication unit 12 (S102). The user terminal 30 displays an image captured by the camera 14 received from the vehicle 10 on the display.

Next, the control unit 11 determines whether or not the user manually switches the imaging ranges to be sequentially displayed to the user (S103). In the method of switching the imaging range, the switching method selected by the user in advance may be stored in the storage unit 13. The control unit 11 may read the switching method selected in advance from the storage unit 13 and set the switching method. Alternatively, each time the user sets the imaging range, the user terminal 30 may select a method of switching the imaging range and transmit the selected method to the vehicle 10.

When manual switching is selected (S103: Yes), the control unit 11 receives a change of the imaging range of the camera 14 from the user terminal 30 via the communication unit 12. In this case, the user operates the input unit of the user terminal 30 to instruct the change of the orientation of the camera 14. For example, the user may instruct the change of the imaging range by moving a finger on the captured image displayed on the touch panel type display. The control unit 11 acquires an instruction to change the imaging range by the user via the communication unit 12, and changes the imaging range of the camera 14 in accordance with the instruction (S104).

The user can specify the imaging range while viewing an image displayed on the display using the user terminal 30.

If there is a place of concern, the user can display and confirm the place. For example, if the user has placed a valuable item on the dashboard 10a of the vehicle 10, the user can cause images of the dashboard 10a to be displayed. A user may designate a particular location, such as a dashboard 10a or glove box, to the imaging area.

The user may specify a plurality of imaging ranges using the user terminal 30. When a plurality of imaging ranges are designated from the user terminal 30, the control unit 11 may repeatedly display the plurality of imaging ranges while sequentially switching the plurality of imaging ranges when the worker 60 unlocks the vehicle 10 for charging.

When manual switching is not selected (S103: No), the control unit 11 causes the camera 14 to change the imaging range in a predetermined order (S105). For example, the control unit 11 controls the imaging range of the camera 14, and sequentially captures images from an area close to the charging port operation unit 17 that operates the charging port 16 to an area away from the charging port operation unit 17. The control unit 11 causes the communication unit 12 to sequentially transmit the captured image to the user terminal 30 in order to confirm the imaging range by the user. The user designates the imaging range of the image determined to be necessary as the imaging range while viewing the images sequentially displayed on the display of the user terminal 30.

The control unit 11 of the vehicle 10 receives the imaging range designated by the user using the user terminal 30 as a setting instruction of the imaging range (S106).

The control unit 11 of the vehicle 10 determines the imaging range according to the received setting instruction, and stores the determined imaging range in the storage unit 13 (S107).

As described above, the user can set the imaging range in the vehicle cabin when the vehicle 10 receives the charging service to the vehicle 10 using the user terminal 30.

Image Capturing Processing When Receiving Charging Service

Figure 6:
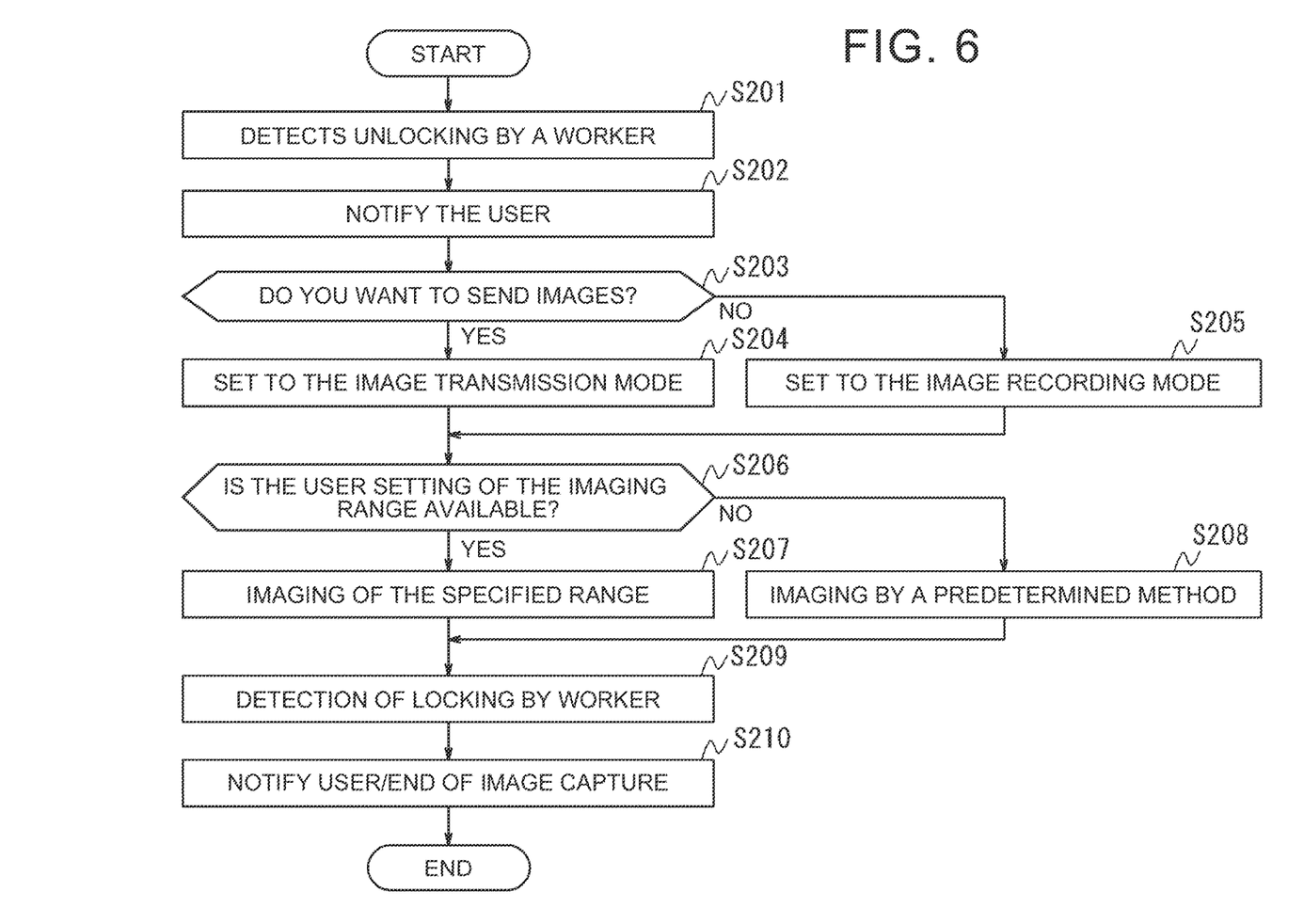
FIG. 6 is a flow chart illustrating an exemplary imaging process executed when the control unit of the vehicle of FIG. 1 receives a charge service.

Referring to the flow chart of FIG. 6, how the worker 60 is imaged when the vehicle 10 is unlocked in order for vehicle 10 to receive the charging service will be described.

First, when the worker 60 of the provider providing the charging service unlocks the vehicle 10, the control unit 11 detects this by the detection mechanism 18 (S201). A method for unlocking the vehicle 10 includes a method in which a digital key of the vehicle 10 is transmitted from the server 20 to the worker terminal 40, and the worker 60 holds the worker terminal 40 over a predetermined place of the vehicle 10 and transmits the digital key to the vehicle 10 by short-range wireless communication. Further, in addition to the method using the digital key, the server 20 may acquire the position information of the vehicle 10 and the position information of the worker terminal 40, and transmit a signal instructing unlocking to the vehicle 10 when the position information of both of them substantially coincides with each other. It is assumed that both the vehicles 10 and the worker terminals 40 have a means for detecting position information, such as a Global Positioning System (GPS) receiver, and are configured to transmit the present position to the servers 20. The method of unlocking the vehicle 10 may be any other method. The detection mechanism 18 can detect that the vehicle 10 is unlocked according to an arbitrary unlocking method. When the unlocking of the vehicle 10 by the worker 60 is detected, the control unit 11 may activate the camera 14.

When the detection mechanism 18 detects that the vehicle 10 is unlocked by the worker 60, the control unit 11 notifies the user terminal 30 that the vehicle 10 is unlocked (S202). The function of notifying that the vehicle 10 has been unlocked may be on/off. When this function is on, the user can know that charging of the vehicle 10 is about to be started.

Next, the control unit 11 determines whether to transmit images to the user terminal 30 (S203). Whether or not to transmit an image to the user terminal 30 may be set in advance by the user using the user terminal 30. Information on whether or not to transmit an image to the user terminal 30 may be stored in advance in the storage unit 13 so that the control unit 11 can refer to the information. In addition, whether or not to transmit images to the user terminal 30 may be selected by the user using the user terminal 30 when the user terminal 30 receives the notification by S202. The result of the user's selection using the user terminal 30 is transmitted to the vehicle 10.

When the control unit 11 determines to transmit an image (S203: Yes), it enters the image transmission mode (S204). In the image transmission mode, the control unit 11 causes the communication unit 12 to transmit the image captured by the camera 14 to the user terminal 30 of the user in real time. The user terminal 30 can display an image received via the network 50 on a display. As a result, the user can confirm the image in the vehicle 10 in real time.

On the other hand, when the control unit 11 determines not to transmit an image (S203: No), it enters the image recording mode (S205). In the image recording mode, the control unit 11 stores the image captured by the camera 14 in the storage unit 13. The image stored in the storage unit 13 can be played back later using the user terminal 30 or another information terminal. Also in the image transmission mode, the control unit 11 can store the image in the storage unit 13 in parallel with the transmission of the image to the user terminal 30.

Next, the control unit 11 confirms whether or not there is a setting of the imaging area by the user (S206). The setting of the imaging range is performed according to the flowchart shown in FIG. 5 which has already been described. The presence or absence of the setting of the imaging range may be stored in the storage unit 13 in advance. When the control unit 11 refers to the storage unit 13 and determines that there is a setting of the imaging range (S206: Yes), it displays an image of the imaging range specified in the flow chart of FIG. 5 (S207). In a case where a plurality of imaging ranges is designated, the control unit 11 may sequentially and repeatedly display the designated imaging ranges.

When the control unit 11 refers to the storage unit 13 and determines that there is no setting of the imaging area (S206: No), it displays the image in a predetermined manner that is initialized (S208). The initialized method may include a method of sequentially displaying the position of the hand of the worker 60, the periphery of the charging port operation unit 17, and the like. The vehicle 10 may have a plurality of predetermined imaging methods, and may be configured such that a user or an application of the control unit 11 can select one imaging method.

After the worker 60 operates the charging port operation unit 17, the control unit 11 continues imaging by the camera 14 until the vehicle 10 is lowered and the vehicle 10 is locked. When the worker 60 detects that the vehicle 10 has been locked by getting off the vehicle 10 (S209), the control unit 11 may notify the user terminal 30 that the worker 60 has got off the vehicle and terminate the imaging by the camera 14 (S210). Locking of the vehicle 10 may be performed by operating the worker terminal 40 by the worker 60, or may be performed automatically at a timing at which, after the vehicle 10 detects that the worker 60 gets off the vehicle by a sensor built in the vehicle 10, charging is started or ended.

In the above-described embodiment, the imaging of the image is started at a timing when the detection mechanism 18 detects that the vehicle 10 has been unlocked. However, the timing of starting the imaging is not limited to this. For example, after unlocking the vehicle 10, the standard time required for starting charging may be set in advance, and the control unit 11 may start capturing an image when the worker 60 is in the vehicle 10 after the standard time has elapsed.

As described above, according to the embodiment of the present disclosure, when the detection mechanism 18 detects that the vehicle 10 has been unlocked by the worker 60 of the charging service provider, the user starts imaging of a predetermined range by the camera 14, so that the user can confirm the work state of the worker 60 with an image. In addition, the worker 60 is notified that the camera 14 is capturing an image, so that it is suppressed from taking an unauthorized action other than the charging operation in the vehicle 10. As a result, the security of the vehicle 10 receiving the charging service is improved, and the user receiving the charging service can feel secure. Even when the user is remote from the vehicle 10, the user can display an image on the display of the user terminal 30 and confirm the image in real time. Therefore, the system 1 is highly convenient.

In addition, by setting the predetermined range to be imaged by the control unit 11 to a range in which at least one of the right hand and the left hand of the worker 60 is present, the user can confirm a portion where the worker 60 is touching in the vehicle 10. This allows the user to reliably confirm the work being performed by the worker 60, thereby further increasing the user's sense of security.

Further, since the user designates an imaging range as a predetermined range and the control unit 11 can image the vehicle cabin of the vehicle 10 based on the imaging range, the user can confirm an image of a portion of interest in the vehicle 10 in particular. The user can use the user terminal 30 to designate an imaging range from a remote location and receive an image captured by the camera 14 at the user terminal 30. Therefore, if the user possesses the user terminal 30, the user can confirm an image in the vehicle 10 after being unlocked for charging regardless of the location. Further, when the user confirms the imaging range for setting the imaging range from the user terminal 30, the control unit 11 can sequentially transmit the image from the region close to the charging port operation unit 17 to the region away from the charging port operation unit 17 to the user terminal 30. In addition, the user can select the imaging range while sequentially confirming the images received by the user terminal 30. This makes it easy for the user to select an imaging range.

It should be noted that the present disclosure is not limited to the above-described embodiments, and many modifications and variations are possible. For example, the components, the functions included in the steps, etc. can be rearranged so as not to logically contradict each other, and a plurality of means or steps, etc. can be combined or divided into one.

What is claimed is:

1. A vehicle having an interior imaging system, comprising:
   a camera that is mounted on the vehicle, configured to capture an image of an inside of the vehicle;
   a detection mechanism configured to detect unlocking of the vehicle by a predetermined worker; and
   a processor configured to
      cause the camera to start capturing an image of a predetermined range in a case where the detection mechanism detects that the vehicle is unlocked by the worker and the worker is present in the vehicle for a predetermined amount of time after the vehicle is unlocked, and
      cause the camera to terminate capturing the image in a case where the detection mechanism detects that the worker has exited the vehicle.

2. The vehicle according to claim 1, wherein the predetermined range includes at least one of a right hand and a left hand of the worker present inside the vehicle.

3. The vehicle according to claim 1, wherein the processor receives designation of an imaging range as the predetermined range, and captures the image of the inside of the vehicle based on the imaging range of which the designation has been received.

4. The vehicle according to claim 3, further comprising:
   an external communication interface configured to communicate with a user terminal carried by a user; and
   in a case where the designation of the imaging range is received from the user terminal via the external communication interface, the processor causes the external communication interface to transmit the image captured by the camera to the user terminal for confirmation of the imaging range by the user.

5. The vehicle according to claim 3, further comprising:
   an external communication interface configured to communicate with a user terminal carried by a user; and
   in a case where the designation of the imaging range is received from the user terminal via the external communication interface, the processor causes the external communication interface to sequentially transmit, to the user terminal, images from a range close to a charge port operation mechanism configured to operate a charge port to a range away from the charge port operation mechanism, for confirmation of the imaging range by the user.

* * * * *